United States Patent
Ouderkirk

(10) Patent No.: US 10,852,556 B1
(45) Date of Patent: Dec. 1, 2020

(54) HEAD MOUNTED DISPLAY WITH EYE TRACKING

(71) Applicant: 3M INNOVATIVE PROPERTIES COMPANY, St. Paul, MN (US)

(72) Inventor: Andrew J. Ouderkirk, Kirkland, WA (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 16/948,510

(22) Filed: Sep. 22, 2020

Related U.S. Application Data

(63) Continuation of application No. 16/188,483, filed on Nov. 13, 2018, now Pat. No. 10,809,531, which is a continuation of application No. 14/910,002, filed as application No. PCT/US2014/053646 on Sep. 2, 2014, now Pat. No. 10,146,055.

(60) Provisional application No. 61/874,822, filed on Sep. 6, 2013.

(51) Int. Cl.
| | | |
|---|---|---|
| *G02B 27/01* | (2006.01) | |
| *G06F 3/01* | (2006.01) | |
| *G02B 27/00* | (2006.01) | |
| *G02B 27/28* | (2006.01) | |
| *G02B 5/30* | (2006.01) | |

(52) U.S. Cl.
CPC ..... *G02B 27/0172* (2013.01); *G02B 27/0093* (2013.01); *G02B 27/017* (2013.01); *G02B 27/283* (2013.01); *G06F 3/013* (2013.01); *G02B 5/30* (2013.01); *G02B 2027/0138* (2013.01); *G02B 2027/0178* (2013.01); *G02B 2027/0187* (2013.01)

(58) Field of Classification Search
CPC ............... G02B 27/0172; G02B 27/01; G02B 27/0093; G06F 3/013
USPC ......................................................... 348/78
See application file for complete search history.

(56) References Cited

U.S. PATENT DOCUMENTS

| | | |
|---|---|---|
| 3,976,364 A | 8/1976 | Lindemann et al. |
| 5,886,822 A | 3/1999 | Spitzer |
| 5,982,555 A | 11/1999 | Melville et al. |
| 6,157,490 A | 12/2000 | Wheatley et al. |
| (Continued) | | |

FOREIGN PATENT DOCUMENTS

| | | |
|---|---|---|
| DE | 102005062847 | 7/2007 |
| JP | 2009-157634 | 7/2009 |
| WO | WO 2012/105500 | 8/2012 |

OTHER PUBLICATIONS

PCT International Search Report from PCT/US2014/053646 dated Jun. 17, 2015, 6 pages.

*Primary Examiner* — Jeffery A Williams
(74) *Attorney, Agent, or Firm* — Robert S. Moshrefzadeh

(57) ABSTRACT

A head mounted display is disclosed. More particularly, a head mounted display including one or more projection light sources, one or more eye-tracking light sources, a polarizing beam splitter, and a second polarizing beam splitter is disclosed. Light from the one or more projection light sources and the one or more projection light sources and the one or more eye-tracking light sources are both at least partially reflected by the polarizing beam splitter. An optical path between the polarizing beam splitter and the second polarizing beam splitter passes through air. A head mounted display that utilizes polarizing beam splitters having certain reflection bandedges over a range of incidence angles is disclosed.

10 Claims, 3 Drawing Sheets

(56) References Cited

U.S. PATENT DOCUMENTS

| | | | |
|---|---|---|---|
| 6,432,854 B1 | 8/2002 | Ueda et al. | |
| 6,667,095 B2 | 12/2003 | Wheatley et al. | |
| 6,967,776 B2 | 11/2005 | Muraguchi et al. | |
| 8,929,589 B2 | 1/2015 | Publicover et al. | |
| 8,970,452 B2 | 3/2015 | Wheeler et al. | |
| 2006/0044514 A1 | 3/2006 | Ushigome | |
| 2007/0285752 A1 | 12/2007 | Ouchi | |
| 2008/0051135 A1 | 2/2008 | Destain et al. | |
| 2009/0040461 A1 | 2/2009 | Efron et al. | |
| 2009/0189974 A1 | 7/2009 | Deering | |
| 2010/0034073 A1 | 2/2010 | Mori et al. | |
| 2010/0202048 A1 | 8/2010 | Amitai et al. | |
| 2012/0019645 A1 | 1/2012 | Maltz | |
| 2012/0268719 A1 | 10/2012 | Yamaguchi | |
| 2013/0106674 A1 | 5/2013 | Wheeler et al. | |
| 2013/0207887 A1 | 8/2013 | Raffle et al. | |
| 2014/0066781 A1 | 3/2014 | Park et al. | |
| 2014/0092364 A1 | 4/2014 | Janssens | |
| 2014/0268346 A1 | 9/2014 | Weber et al. | |
| 2015/0301593 A1 | 10/2015 | Border et al. | |
| 2015/0309314 A1 | 10/2015 | Border et al. | |
| 2016/0091722 A1* | 3/2016 | Liu | G06F 3/013 345/8 |

\* cited by examiner

HEAD MOUNTED DISPLAY WITH EYE TRACKING

BACKGROUND

Head mounted displays, as a subset of wearable computing devices, often utilize projected light to display an image within the wearer's visual field. Eye tracking systems may utilize a camera centered on the wearer's pupil or observe light reflected off a wearer's eye to detect gaze direction.

SUMMARY

In one aspect, the present disclosure relates to a head mounted optical device. The head mounted optical device includes one or more projection light sources, one or more eye tracking light sources, a polarizing beam splitter, and a second polarizing beam splitter. The optical device is configured such that projection light from the one or more projection light sources and eye-tracking light from the one or more eye-tracking light sources are both at least partially reflected by the polarizing beam splitter and such that an optical path between the polarizing beam splitter and the second polarizing beam splitter for at least one of projection light from the one or more projection light sources and eye-tracking light from the one or more eye-tracking light sources passes through air.

In another aspect, the present disclosure related to a head mounted optical device that includes one or more projection light sources, one or more eye tracking light sources, a polarizing beam splitter, and a second polarizing beam splitter. The optical device is configured such that projection light from the one or more projection light sources and eye-tracking light from the one or more eye-tracking light sources are both at least partially reflected by the polarizing beam splitter. As measured between 40 degrees and 50 degrees in a medium with a refractive index of about 1.53, the polarizing beam splitter has a right band edge between about 950 nm and about 850 nm. In some embodiments, as measured between 40 degrees and 50 degrees in a medium with a refractive index of about 1.53, the second polarizing beam splitter has a right band edge between about 800 nm and about 700 nm.

At least one of the polarizing beam splitter and the second polarizing beam splitter may include multilayer optical film. The eye-tracking light from the one or more eye-tracking light sources may include infrared light. In some embodiments, the eye-tracking light from the one or more eye-tracking light sources includes a substantial portion of light with a wavelength between 700 nm and 1000 nm. In some embodiments, an eye-tracking wavelength range of the eye-tracking light from the one or more eye-tracking light sources and a projection wavelength range of the projection light from the one or more projection light sources do not overlap. In some embodiments, the polarizing beam splitter reflects at least 50% of a first polarization state but less than 50% of a second orthogonal polarization state of eye-tracking light from the one or more eye-tracking light sources. In some embodiments, the polarizing beam splitter reflects at least 50% of both a first polarization state and a second orthogonal polarization state of eye-tracking light from the one or more eye-tracking light sources. In some embodiments, the polarizing beam splitter reflects at least 50% of a first polarization state but less than 50% of a second orthogonal polarization state of projection light from the one or more projection light sources. In some embodiments, the second polarizing beam splitter transmits at least 50% of both a first polarization state and a second polarization state of eye-tracking light from the one or more eye-tracking light sources. The polarizing beam splitter and the second polarizing beam splitter may have different right band edges. In some embodiments, the polarizing beam splitter and the second polarizing beam splitter have substantially equal left band edges. In some embodiments, when measured at 45 degrees in a medium with a refractive index of about 1.53, the polarizing beam splitter has a right band edge of about 900 nm. When measured at 45 degrees in a medium with a refractive index of about 1.53, the second polarizing beam splitter may have a right band edge of about 750 nm. In some embodiments, the head mounted optical device includes a quarter wave plate. In some embodiments, the head mounted optical device includes an image sensor. The image sensor may include a CCD imager or it may include a CMOS imager. In some embodiments, the head mounted optical device includes a frame, and the image sensor is disposed within the frame. The polarizing beam splitter may be immersed in a lens.

DETAILED DESCRIPTION

As a subset of wearable computing devices, head mounted displays may correspond in appearance to accessories such as glasses that are worn publicly. Correspondingly, it may desirable when incorporating systems into a head mounted display to add minimal bulk and conspicuity. Similarly, interaction with and control of head mounted displays, again owing to its potential for public use, may be designed to be as inconspicuous and appear as natural in social settings as possible. Alternatively, head mounted displays may be desirable in industrial settings when the wearable device has other purposes, such as occupational safety. In this case, it may be advantageous to configure the systems as to not expose sensitive electronics to the industrial environment. Eye tracking systems may be incorporated into head mounted displays in order to allow relatively unnoticeable eye movements to be detected and interpreted. For example, a head mounted display may be configured to detect when a wearer's gaze is focused on a certain portion of the display.

In previous head mounted displays that included eye tracking, many use a camera positioned at the opposite side of the head mounted display from the projection optics, as described in United States Patent Publication No. 2013/0106674 A1 (Wheeler et al.). This prevents both the eye tracking camera and the projection optics from being hidden within a frame and creates a noticeable object that may obscure part of a wearer's field of view.

Figure 1:
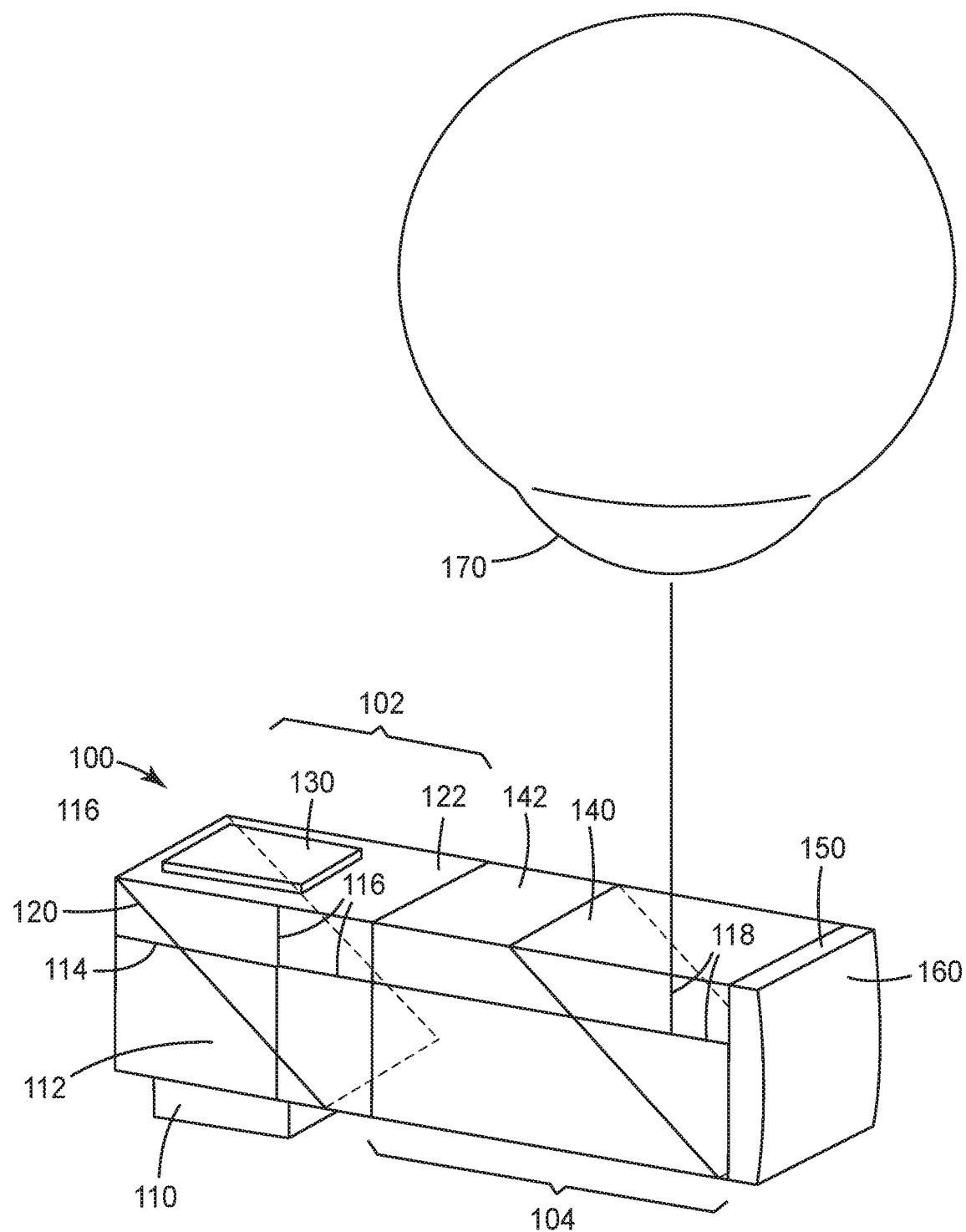
FIG. 1 is a schematic top perspective view of a head mounted optical device.

FIG. 1 is a top perspective view of a head mounted display. Head mounted display 100 includes frame region 102 and viewing region 104. Frame region 102 includes illuminator 110, polarizing beam splitter 120 within medium 122, and spatial light modulator 130. Viewing region 104 includes second polarizing beam splitter 140 within second medium 142, quarter wave plate 150, and reflector 160. Eye 170 is shown to illustrate the optical path of projection light from illuminator 110. For purposes of this application, the label "second" in "second polarizing beam splitter" is used simply to distinguish the two polarizing beam splitters by the order of their description; in other words, the label is arbitrary and for ease of explanation only. In some embodiments, for example, what is described herein as the second polarizing beam splitter may be equally be described as the polarizing beam splitter, and vice versa.

Illuminator 110 may be any suitable component or set of components for generating or emitting light. Illuminator may include one or more light sources, including light emitting diodes (LEDs), cold cathode fluorescent lights (CCFLs), or incandescent light bulbs. Illuminator 110 may be powered by any suitable mechanism, including by a battery. Illuminator 110 may include any combination of light sources, including light sources of different wavelength ranges. In some embodiments, the light sources of illuminator 110 may generate white or substantially white light. In some embodiments, illuminator 110 may generate polarized or partially polarized light, or it may generate a certain distribution of polarization states. The configuration and construction of illuminator 110 may depend on the desired performance characteristics, including luminance, battery life, and operating temperature. In some embodiments, the luminance and wavelength output of illuminator 110 may be configurable, either directly by a wearer or automatically depending on environmental conditions, such as time of day, ambient light, desired battery life performance, or temperature.

Light emitted by illuminator 110 is indicated in FIG. 1 by projected light 112. Projected light 112 is depicted as a ray for ease of illustration, but it should be evident to those with skill in the art that projected light 112 is representative of any suitable light distribution, including collimated or Lambertian distributions, light cones, or the like. Suitable collimation optics may be included in conjunction with illuminator 110 to provide the desired light distribution of projected light 112.

Projected light 112 is incident on polarizing beam splitter 120 from medium 122. Medium 122 may be any suitable optical medium. In some embodiments, medium 122 is substantially transparent to minimize optical loss. In some embodiments, medium 122 is selected for durability or protective characteristics in order to provide rigidity, warp, or impact resistance for the components of head mounted display 100. Medium 122 may also be selected for its manufacturability, including its ability to be injection molded. Medium 122 may have any index of refraction and may be optically coupled to illuminator 110 to minimize losses through Fresnel reflection at the interface between the illuminator and the medium. Further, polarizing beam splitter 120 exhibits different optical properties, for example, different reflection bandedges at least in part as a function of the refractive index of the medium in which it is disposed. Therefore, it may be desirable to carefully select medium 122 based on the desired optical properties of the medium/polarizing beam splitter system.

Polarizing beam splitter 120 may be formed from any suitable material and may be any suitable shape or size. In some embodiments, polarizing beam splitter 120 may be substantially planar, as depicted in FIG. 1. In some embodiments, polarizing beam splitter 120 may be oriented such that projected light 112 is incident at 45°. Other orientations may be desirable based on the optical geometry of head mounted display 100. In some embodiments, the polarizing beam splitter substantially reflects light of one polarization while substantially transmitting light having the orthogonal polarization state. Many different proportions or reflectivity and transmittance may be appropriate depending on the particular application. In some embodiments, reflecting light of one polarization may mean reflecting 50% or more of light having a certain polarization state. In some configurations, reflecting light of one polarization may mean reflecting 60%, 70%, 80%, 90%, 95% or even 99% of light of one polarization. Similarly, transmitting light of an orthogonal polarization may mean transmitting more than 50% of light of having an orthogonal polarization state. In some embodiments, 60%, 70%, 80%, 90%, 95%, or even 99% of light having an orthogonal polarization may be transmitted. Polarizing beam splitter 120 may be described as having a pass axis and a block axis, with the pass axis and block axis being oriented substantially at a 90° angle from one another.

Polarizing beam splitter 120 may include a reflective polarizer. In some embodiments, polarizing beam splitter 120 includes a wire grid polarizer or a cholesteric reflective polarizer. The reflective polarizer may be a broadband reflective polarizer. In some embodiments, polarizing beam splitter 120 may include a multilayer optical film reflective polarizer, including, for example, those described in U.S. Pat. No. 7,468,204 (Hebrink et al.).

Depending on the configuration, orientation, and construction of polarizing beam splitter 120 and its surrounding medium, including incident angle, polarizing beam splitter 120 may exhibit different transmission or reflection properties based on the wavelength or wavelengths of incident light. In some embodiments, there may be a wavelength for a given angle of incidence where the polarizer ceases to behave as a polarizing beam splitter; that is, for example, it may transmit two orthogonal states of incident light. This wavelength for a given incidence angle may be described as a bandedge. For a typical polarizing beam splitter there will be two bandedges: a left (or lower wavelength) and a right (or higher wavelength) bandedge. Bandedges are also described in conjunction with FIG. 3.

At least a portion of projected light 112 is transmitted through polarizing beam splitter 120. In some embodiments, a first portion of projected light 112 having a first polarization state is transmitted while another portion, in some cases having a second, orthogonal polarization state, is reflected as rejected light 114. Rejected light 114 may in some cases be directed toward a light absorbing material. In embodiments of the present disclosure where projected light 112 is at least partially polarized to align with the pass axis of the polarizing beam splitter, a higher proportion of projected light 112 may pass through polarizing beam splitter 120.

The portion of projected light 112 that is transmitted through polarizing beam splitter 120 is next incident on spatial light modulator 130. Spatial light modulator may be any suitable component or device, and may have any suitable size. In some embodiments, spatial light modulator may be or include a digital micromirror device or a liquid crystal on silicon configuration. Spatial light modulator 130 may reflect projected light 112 as modulated light 116. In some cases, spatial light modulator 130 produces light having grayscale information. In other embodiments, spatial light modulator additionally produces light having color information. Modulated light 116 may now have spatially dependent luminance and color values; in other words, spatial light modulator may provide image information to modulated light 116. In some embodiments, spatial light modulator 130 may be capable of producing an image in only one color at a time, instead relying on human perception to blend different colored images relayed in rapid succession. Spatial light modulator 130 may be powered, driven, and/or configured by any suitable components, including one or more microprocessors, microchips, or other microdevices. In some embodiments, spatial light modulator 130 rotates the polarization of at least a part of projected light 112, so that in some cases at least a portion of modulated light 116 is reflected by polarizing beam splitter 120 instead of transmitted.

Modulated light 116 travels from frame region 102 of head mounted display 100 into viewing region 104 and second medium 142 of the head mounted display. Note that frame region 102 and viewing region 104 are distinguished for ease of explanation, but do not necessarily need to have any identifiable boundary or represent a substantive difference in medium, shape, or size. The regions are labeled to orient head mounted display 100 by describing a region which may be positioned to be closer to a frame. Similarly, for example, frame region 102 is distinguished from viewing region 104 because frame region 102 may in some cases contain components positioned such that a viewer would not observe that region to be transparent.

In some cases, frame region 102 and viewing region 104 are separated by or include a gap; that is, there may be air or another low index material separating or within the two media. In other words, there may be a gap between polarizing beam splitter 120 and second polarizing beam splitter 140. In some embodiments the optical path between polarizing beam splitter 120 and second polarizing beam splitter 140 passes through air. Utilizing a gap may have certain physical advantages, such as lower overall weight and better comfort and aesthetics. More design flexibility is also possible, because the system is not limited to the rectilinear optics of a monolithic injection molded piece, such as the one described in U.S. Patent Publication No. 2013/0207887 A1. Such a configuration may also provide desirable optical properties, such as more desirable levels of magnification for the projected (i.e., display) light. Further, in some embodiments including a gap, light may become at least partially collimated; that is, light rays incident from the lower gap index of refraction to a higher index of refraction may be bent toward the normal, which may be desirable in some applications.

After entering viewing region 104 of head mounted display 100, modulated light 116 is incident on second polarizing beam splitter 140 from second medium 142. In some embodiments, second medium 142 may be the same material—even being a unitary construction—or it have the same index of refraction as medium 122. Second polarizing beam splitter 140 may be oriented such that modulated light 116 is incident at 45°. Second polarizing beam splitter 140 may be configured or tuned with some or all of the same considerations as described above for polarizing beam splitter 120. In some embodiments, one or more bandedges of second polarizing beam splitter 140 may be the same as for polarizing beam splitter 120. Second polarizing beam splitter 140 may be configured to transmit most or all of modulated light 116, that is, to transmit the light reflected by polarizing beam splitter 120. This may mean that the pass axis of polarizing beam splitter 120 and the pass axis of second polarizing beam splitter 140 are oriented substantially orthogonally to one another. In other words, polarizing beam splitter 120 and second polarizing beam splitter 140 may be crossed.

Modulated light 116, after at least partially transmitted through second polarizing beam splitter 140 in incident on quarter wave plate 150 disposed on reflector 160. Modulated light 116 passes through quarter wave plate 150, is reflected by reflector 160, and passes back through quarter wave plate 150. Quarter wave plate 150 may be any suitable quarter wave retarder, including suitable birefringent materials or liquid crystal layers. The thickness of quarter wave plate 150 may be selected to provide acceptable polarization rotation performance for a wavelength or a set of wavelengths. Quarter wave plates are generally configured to change the polarization state from linear to circular polarization, or vice versa. Passing through a quarter wave plate twice may have the same effect on the polarization state of light as passing through a half wave plate; that is, the polarization state may be rotated 90°. Reflector 160 may be any suitable reflector, including a standard mirror or a multilayer optical film reflector, such as Enhanced Specular Reflector (ESR) available from 3M Company, St. Paul, Minn.

Modulated light 116, after passing through quarter wave plate 150 twice, may have its polarization state rotated, becoming rotated light 118. In some embodiments, this may cause rotated light 118 to be substantially or at least partially reflected by second polarizing beam splitter 140 instead of transmitted (as modulated light 116, having an orthogonal polarization state, was). Rotated light 118, after being reflected by second polarizing beam splitter 140, passes out of second medium 142 and into the surrounding air, and is eventually observed by a viewer through eye 170. In some embodiments, the geometry and design of the interface between second medium 142 and air may be designed or configured to compensate for refraction as the light travels from an area of higher refractive index to an area of lower refractive index.

Figure 2:
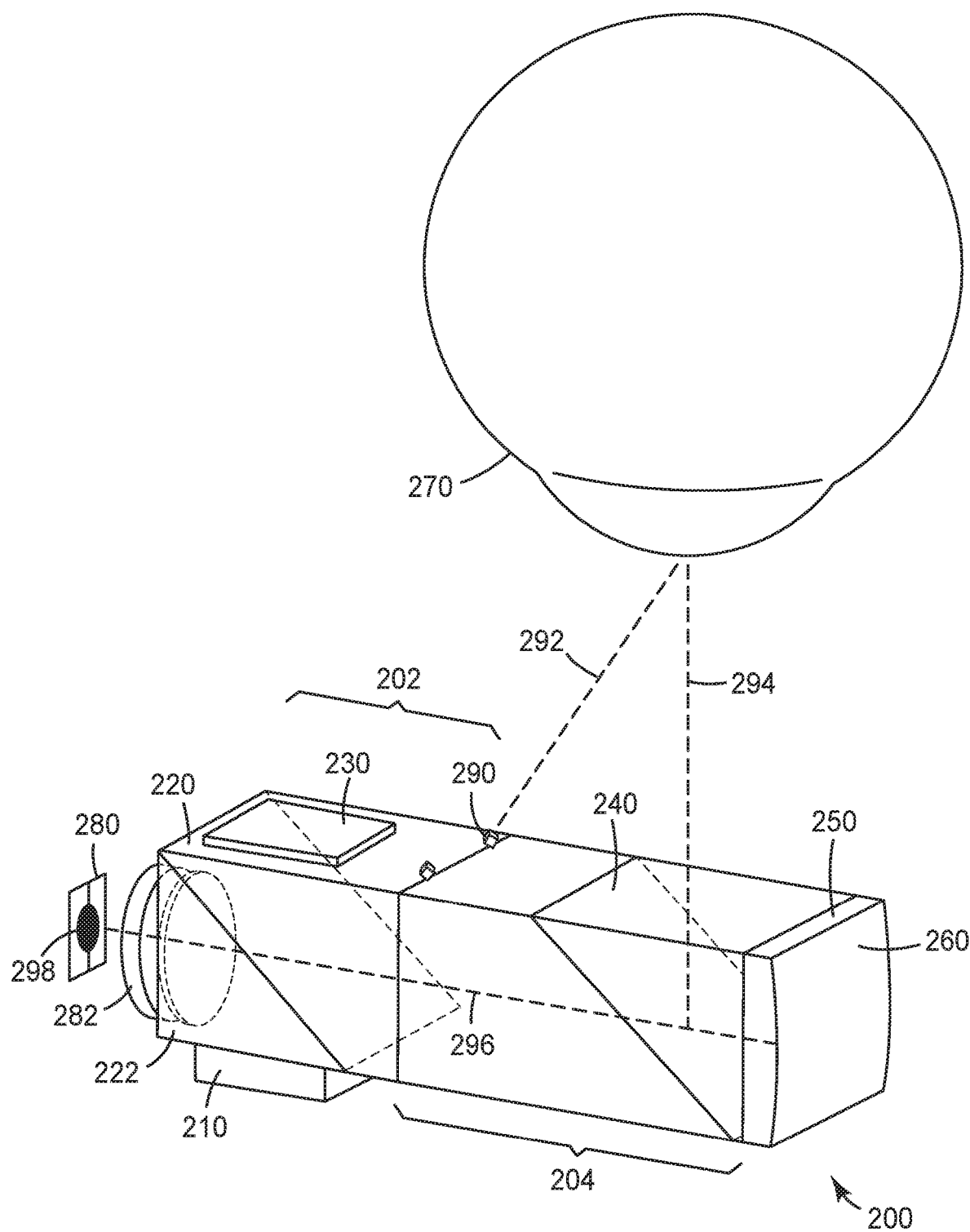
FIG. 2 is a schematic top perspective view of the head mounted optical device of FIG. 1 including an eye tracking system.

FIG. 2 schematically illustrates a top perspective view of the head mounted optical device of FIG. 1 including an eye tracking system. Head mounted display 200 is similar to head mounted display 100 as depicted in FIG. 1. Corresponding with FIG. 1, head mounted display 200 includes, separated into frame region 202 and viewing region 204, illuminator 210, polarizing beam splitter 220 in medium 222, spatial light modulator 230, second polarizing beam splitter 240 in medium 242, quarter wave plate 250, and reflector 260. The description and operation of these components for projecting light to eye 270 is not shown in FIG. 2 for ease and clarity of illustration. Head mounted display 200 also includes image sensor 280 including lens 282, and eye-tracking light sources 290.

Eye-tracking light sources 290 may be any number of light emitting components. In some embodiments, eye-tracking light sources 290 may include one or more LEDs. In some embodiments, eye-tracking light sources 290 may emit light at least partially outside the visible spectrum. Eye-tracking light sources 290 may emit infrared light. In some embodiments, eye-tracking light sources 290 may emit light having multiple discrete wavelengths or a range of wavelengths. In some cases, eye-tracking light sources 290 may emit at least partially polarized light. Eye-tracking light sources 290 may be configured on head mounted display 200 such that the eye-tracking light sources are inconspicuous and non-obscuring.

Eye-tracking light sources 290 emit light represented by eye-tracking light 292. Eye-tracking light 292 is later incident on at least a portion of eye 270. Eye-tracking light sources 290 may be configured or positioned such that the incidence angle of eye-tracking light 292 on eye 270 is low; in some cases as low as practically possible given other design considerations.

Eye-tracking light 292 may be incident on one or more portions of eye 270. The reflections at several refractive index interfaces at and within the eye are generally referred to as Purkinje images, of which there are four. For example, light reflected by the cornea of the eye is referred to as the first Purkinje image, while light reflected by the back of the lens (of the eye) is referred to as the fourth Purkinje image. In some embodiments, eye-tracking light 292 may be configured to reflect at one or more of these interfaces, resulting in Purkinje light 294. Purkinje light 294 may, as described elsewhere, include one or more of the Purkinje images generated by the reflection of light at interfaces of the eye.

Purkinje light 294 enters second medium 242 and is incident on second polarizing beam splitter 240. As described for head mounted display 100 in FIG. 1, the outer geometry of head mounted display 200 may be configured to compensate for refraction caused by the change in medium at the interface between air and second medium 242. Second polarizing beam splitter 240 may be configured to at least partially reflect Purkinje light 294 having a certain polarization state. In some embodiments, second polarizing beam splitter 240 may be configured to reflect most or all of Purkinje light 294. In embodiments where at least some of Purkinje light 294 is transmitted through second polarizing beam splitter 240, the light continues through the other side of viewing region 204. In some embodiments, it may be important to minimize these losses by controlling the initial polarization of eye-tracking light 292 (and thereby Purkinje light 294).

Purkinje light being reflected by second polarizing beam splitter 240 is incident on quarter wave plate 250 and reflector 260. As for projected light (modulated light 116) described in FIG. 1, passing through quarter wave plate 250 twice may rotate the polarization of Purkinje light 294 by 90°, represented by rotated Purkinje light 296. Rotated Purkinje light 296 is incident on second polarizing beam splitter 240 and is at least partially transmitted. In some embodiments, most or all of rotated Purkinje light 296 is transmitted by second polarizing beam splitter.

Rotated Purkinje light 296 then enters medium 222 and is incident on polarizing beam splitter 220. In some embodiments, rotated Purkinje light 296 is also transmitted by polarizing beam splitter 220. Note that in some embodiments described in FIG. 1, the pass axis for polarizing beam splitter 120 (corresponding with polarizing beam splitter 220) and the pass axis of second polarizing beam splitter 140 (corresponding with second polarizing beam splitter 240) are orthogonal. Thus, in order for both polarizing beam splitters to pass rotated Purkinje light 296 of the same polarization state, polarizing beam splitter 220 may in some embodiments at least partially transmit light of both polarization states. In some embodiments, polarizing beam splitter 220 may substantially pass light of a first polarization state and substantially reflect light of a substantially orthogonal polarization state for light having a first wavelength or wavelength range, and transmit light of both polarization states for light having a second wavelength or wavelength range, where the first wavelength or wavelength range is different from the second wavelength or wavelength range. In some embodiments, polarizing beam splitter 220 and second polarizing beam splitter 240 may have different right bandedges. This may, in some cases, correspond to orthogonal polarization states of infrared light being substantially transmitted by a polarizing beam splitter while only one polarization state of visible light is substantially transmitted. The other polarizing beam splitter may substantially transmit only one polarization state of both infrared and visible light. These bandedge profiles are discussed in conjunction with FIG. 3, below.

Rotated Purkinje light 296 passes through lens 282 and may be focused, concentrated, or inverted, creating Purkinje image 298 on image sensor 280. In some embodiments, lens 282 may include a filter, including a filter that passes only infrared light. As described elsewhere, Purkinje image 298 may include one or more of the four Purkinje images reflected from eye 270. Image sensor 280 may be or include a passive-pixel sensor, such as a charge-coupled device, or CCD. In some embodiments, image sensor 280 may include an active-pixel sensor, such as a sensor including a complementary metal-oxide-semiconductor (CMOS). Any suitable electronics may accompany image sensor 280, including one or more processors (not shown) to interpret the location and character of Purkinje image 298. The one or more processors may transmit or modify information based on Purkinje image 298. For example, the one or more processors may make a portion of the projected light brighter based on where the processor detects the viewers gaze is focused. In some embodiments, the one or more processors may also or alternatively determine pupil size, change in pupil size, eye movement, or eye moisture. This information may be used to determine a viewer's interest or reaction to certain content. In some embodiments the processor may receive input commands to interact with head mounted display 200 based on gestures that utilize gaze direction.

Figure 3:
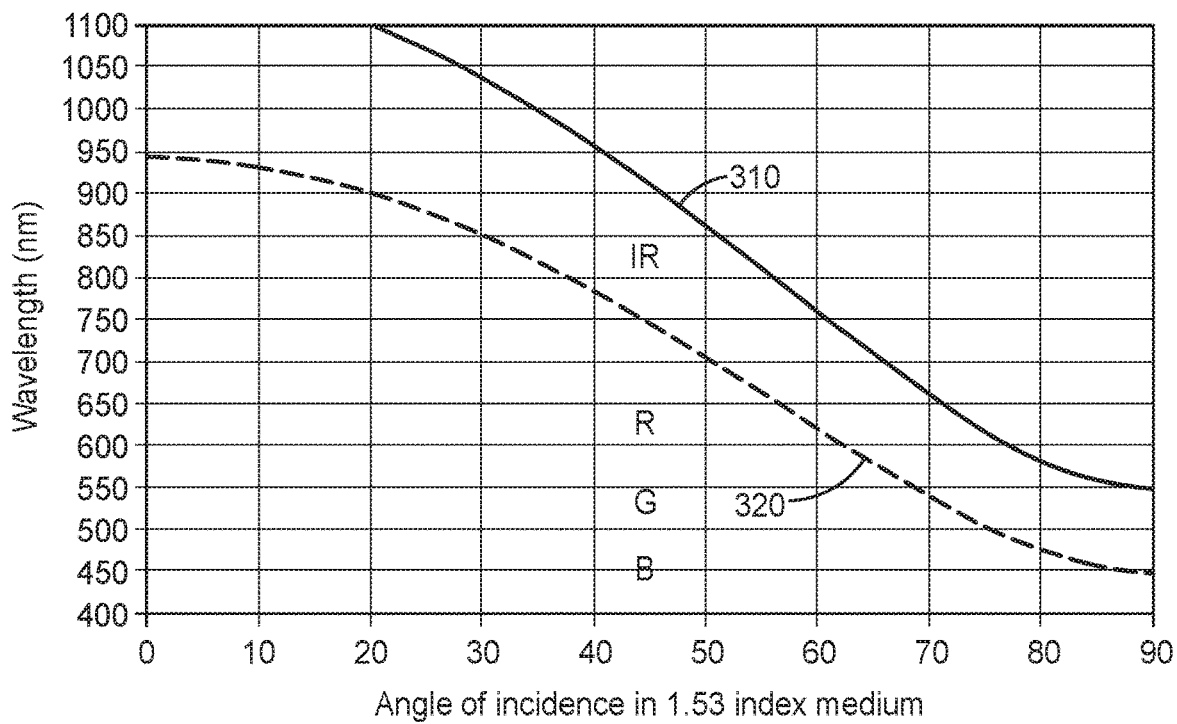
FIG. 3 is a graph depicting the right reflection band edge as a function of incidence angle for several polarizing beam splitters.

FIG. 3 is a graph depicting the relationship between (right) reflection bandedge and incidence angle for two polarizing beam splitters in a 1.53 index medium. For some applications, given the geometry of the optical system, the position of the bandedge at 45° may be of particular interest. First polarizing beam splitter, depicted by line 310, has a right bandedge at 45° of about 900 nm. This polarizing beam splitter may reflect one of each orthogonal polarization state for both visible light and at least a portion of the near infrared spectrum, for example, 825 nm light. Second polarizing beam splitter, represented by line 320, has a right bandedge at 45° incidence of about 750 nm. This polarizing beam splitter may reflect one of each orthogonal polarization state for visible light but may substantially transmit both states of at least a portion of the near infrared spectrum, for example, 825 nm light.

In some embodiments, angles of incidence at 45° may represent only an ideal case and the reflection bandedges over a more realistic or wider range of angles may result in lost light and color defects. For example, light generated by an LED having a generally Lambertian distribution may be collimated by various optical elements as to approach perfect collimation, yet will never reach it. Further, in many cases, efforts to perfectly collimate Lambertian light often results in unacceptable brightness and efficiency losses, which may, for example, contribute to a diminished battery life. In other words, actual angles of incidence on one or more reflective polarizers, even for a substantially rectilinear head mounted display, may more realistically be characterized and be important over a range of between 40 and 50 degrees, or between 30 and 60 degrees. Therefore, in some embodiments, because reflection bandedges shift with incidence angle, failing to consider and design for the reflection bandedge's variation over a range of angles may result in unacceptable optical performance in many applications; for example, a polarizing beam splitter that is designed to transmit both states of infrared light at a 45° incidence may begin to reflect one or more polarization states of infrared light over a more realistic range of angles. Certain reflective polarizers, such as those with the performance shown in FIG. 3 or, for example, Advanced Polarizing Film (APF) available from 3M Company, St. Paul, Minn., may be more suitable for a realistic range of incidence angles.

The labels for first and second polarizing beam splitters described in conjunction with this graph are for the convenience of distinguishing the two and do not necessarily correspond to the polarizing beam splitter and the second polarizing beam splitter described in FIGS. 1-2. The values and curve profiles shown are exemplary and may be altered depending on the desired application or specific configuration of the polarizing beam splitter.

Figure 4:
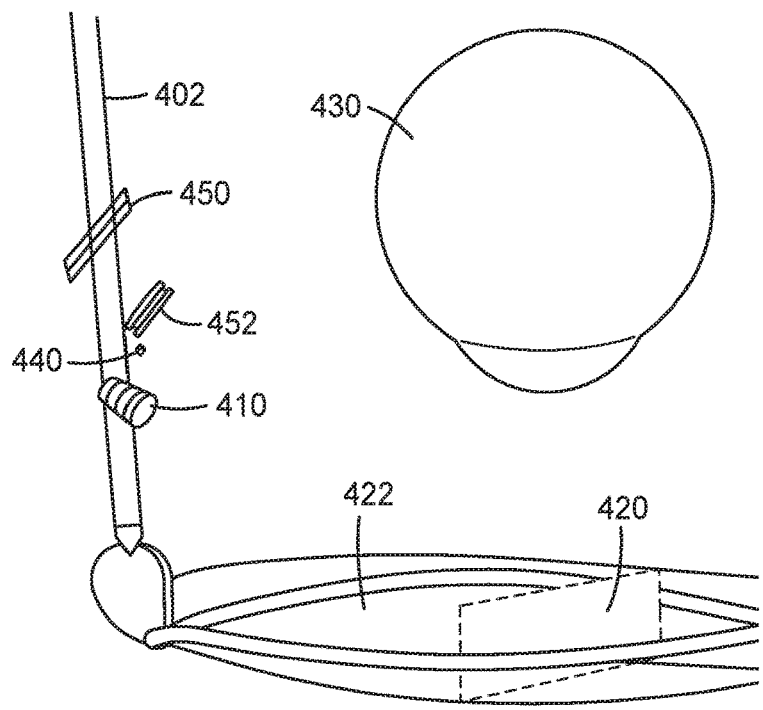
FIG. 4 is a schematic top perspective view of another head mounted optical device including an eye tracking system.

FIG. 4 is schematic top perspective view of another head mounted optical device including an eye tracking system. Head mounted display 400 includes frame 402, projection optics 410, immersed polarizing beam splitter 420 in lens 422, eye-tracking light sources 440, and image sensor 450 including lens 452.

Frame 402 may be any suitable shape and size or made from any suitable material. In some embodiments, frame 402 may be configured to appear as a standard glasses frame. In some embodiments, frame 402 may be configured to conceal at least some of the components of head mounted display 400.

Projection optics 410 are not shown in detail in FIG. 4 but may be any suitable configuration or set of components, including, for example, a digital micromirror projection system or a liquid crystal on silicon system. Depending on the desired application of head mounted display 400 projection optics 410 may produce projection light of a single wavelength or projection light having multiple discrete wavelengths or a range of wavelengths. In some embodiments, projection optics 410 may produce at least partially polarized light. Projection optics 410 may also contain a polarizing beam splitter. Note that, for the head mounted display shown in FIG. 4, in these cases the optical path between the polarizing beam splitter included in projection optics 410 and immersed polarizing beam splitter 420 passes through air.

Immersed polarizing beam splitter 420 may behave as any of the polarizing beam splitters described elsewhere in the present disclosure; it may substantially reflect one polarization of light while substantially transmitting an orthogonal polarization or it may instead or additionally substantially transmit both polarizations of light in a certain wavelength range. In some embodiments it may also substantially reflect both polarizations of light in a certain wavelength range. Immersed polarizing beam splitter 420 may be configured such that emitted light from projection optics 410 has the right incidence angle in order to provide a desired optical performance. Immersed polarizing beam splitter 420 along with lens 422 may be curved or shaped such that light incident from projection optics 410 is reflected as to be viewable at eye 430.

Eye-tracking light sources 440 may be any appropriate number and any suitable type of light source, including those described for eye-tracking light sources 290 in conjunction with FIG. 2. Eye-tracking light sources 440 may emit light in the infrared spectrum. In some embodiments, light from eye-tracking light sources 440 may be configured with immersed polarizing beam splitter 420 and lens 422 such that the geometry causes light emitted from eye-tracking light sources 440 to be at least partially reflected by immersed polarizing beam splitter 420 and directed into eye 430, where the reflected Purkinje image is directed back through lens 452, where the image may be focused or concentrated onto image sensor 450. As with image sensor 280 in FIG. 2 whose description applies to this embodiment, image sensor 450 may include suitable components and electronics, including CMOS and CCD sensors.

Embodiments of the present disclosure may be suitable for incorporation into many head mounted optical displays, devices, or other near-to-eye or wearable computers. Note that in some embodiments, because a polarizing beam splitter located in front of the eye at least partially transmits visible light of one or both orthogonal polarization states, a viewer may observe real world scenes through the head mounted display. In some embodiments where a polarizing beam splitter located in front of the eye at least partially reflects a polarization state of light, the head mounted display may have the added benefit of reducing glare from reflected light.

The following are a list of items of the present disclosure:

Item 1 is a head-mounted optical device, comprising:
one or more projection light sources;
one or more eye-tracking light sources;
a polarizing beam splitter; and
a second polarizing beam splitter;
wherein the optical device is configured such that projection light from the one or more projection light sources and eye-tracking light from the one or more eye-tracking light sources are both at least partially reflected by the polarizing beam splitter; and
wherein the optical device is configured such that an optical path between the polarizing beam splitter and the second polarizing beam splitter for at least one of projection light from the one or more projection light sources and eye-tracking light from the one or more eye-tracking light sources passes through air.

Item 2 is a head-mounted optical device, comprising:
one or more projection light sources;
one or more eye-tracking light sources;
a polarizing beam splitter; and
a second polarizing beam splitter;
wherein the optical device is configured such that projection light from the one or more projection light sources and eye-tracking light from the one or more eye-tracking light sources are both at least partially reflected by the polarizing beam splitter; and
wherein as measured between 40 degrees and 50 degrees in a medium with a refractive index of about 1.53, the polarizing beam splitter has a right band edge between about 950 nm and about 850 nm.

Item 3 is the head-mounted optical device of item 2, wherein as measured between 40 degrees and 50 degrees in a medium with a refractive index of about 1.53, the second polarizing beam splitter has a right band edge between about 800 nm and about 700 nm.

Item 4 is the head-mounted optical device as in either item 1 or item 2, wherein at least one of the polarizing beam splitter and the second polarizing beam splitter include multilayer optical film.

Item 5 is the head-mounted optical device as in either item 1 or item 2, wherein the eye-tracking light from the one or more eye-tracking light sources includes infrared light.

Item 6 is the head-mounted optical device as in either item 1 or item 2, wherein the eye-tracking light from the one or more eye-tracking light sources includes a substantial portion of light with a wavelength between 700 and 1000 nm.

Item 7 is the head-mounted optical device as in either item 1 or item 2, wherein a eye-tracking wavelength range of the eye-tracking light from the one or more eye-tracking light sources and a projection wavelength range of the projection light from the one or more projection light sources do not overlap.

Item 8 is the head-mounted optical device as in either item 1 or item 2, wherein the polarizing beam splitter reflects at least 50% of a first polarization state but less than 50% of a second orthogonal polarization state of eye-tracking light from the one or more eye-tracking light sources.

Item 9 is the head-mounted optical device as in either item 1 or item 2, wherein the polarizing beam splitter reflects at least 50% of both a first polarization state and a second orthogonal polarization state of eye-tracking light from the one or more eye-tracking light sources.

Item 10 is the head-mounted optical device of item 9, wherein the polarizing beam splitter reflects at least 50% of a first polarization state but less than 50% of a second orthogonal polarization state of projection light from the one or more projection light sources.

Item 11 is the head-mounted optical device as in either item 1 or item 2, wherein the second polarizing beam splitter transmits at least 50% of both a first polarization state and a second orthogonal polarization state of eye-tracking light from the one or more eye-tracking light sources.

Item 12 is the head-mounted optical device as in either item 1 or item 2, wherein the polarizing beam splitter and the second polarizing beam splitter have different right band edges.

Item 13 is the head-mounted optical device as in item 12, wherein the polarizing beam splitter and the second polarizing beam splitter have substantially equal left band edges.

Item 14 is the head-mounted optical device of item 1, further comprising a quarter wave plate.

Item 15 is the head-mounted optical device of item 1, further comprising an image sensor.

Item 16 is the head-mounted optical device of item 15, wherein the image sensor includes a CCD imager.

Item 17 is the head-mounted optical device of item 15, wherein the image sensor includes a CMOS imager.

Item 18 is the head-mounted optical device as in any one of items 15-17, further comprising a frame, wherein the image sensor is disposed within the frame.

Item 19 is the head-mounted optical device of item 1, wherein the polarizing beam splitter is immersed in a lens.

All U.S. patents and publications cited in the present application are incorporated herein by reference as if fully set forth. The present invention should not be considered limited to the particular embodiments described above, as such embodiments are described in detail in order to facilitate explanation of various aspects of the invention. Rather, the present invention should be understood to cover all aspects of the invention, including various modifications, equivalent processes, and alternative devices falling within the scope of the invention as defined by the appended claims and their equivalents.

What is claimed is:

1. A head-mounted optical device comprising:
   an eye-tracking light source configured to emit an eye-tracking light;
   a first polarizing beam splitter; and
   a second polarizing beam splitter,
   wherein the first polarizing beam splitter reflects at least 50% of the eye-tracking light having a first polarization state and less than 50% of the eye-tracking light having an orthogonal second polarization state, and
   wherein the second polarizing beam splitter transmits at least 50% of the eye-tracking light for each of the first and second polarization states.

2. The head-mounted optical device of claim 1, wherein the first and second polarizing beam splitters have substantially equal left band edges and different right band edges.

3. The head-mounted optical device of claim 1 further comprising a projection light source configured to emit visible light.

4. The head-mounted optical device of claim 1 further comprising a wave plate for rotating a polarization state of light, the second polarizing beam splitter disposed between the first polarizing beam splitter and the wave plate.

5. The head-mounted optical device of claim 1 further comprising a reflector for reflecting light, the second polarizing beam splitter disposed between the first polarizing beam splitter and the reflector.

6. The head-mounted optical device of claim 1, wherein for light incident at about 45 degrees, the first polarizing beam splitter has a right band edge between about 950 nm and about 850 nm.

7. The head-mounted optical device of claim 1, wherein for light incident at about 45 degrees, the second polarizing beam splitter has a right band edge between about 800 nm and about 700 nm.

8. The head-mounted optical device of claim 1, wherein the eye-tracking light comprises infrared light.

9. The head-mounted optical device of claim 1, wherein at least one of the first and second polarizing beam splitters is immersed in a lens.

10. The head-mounted optical device of claim 1, wherein at least one of the first and second polarizing beam splitters includes a multilayer optical film.

* * * * *